(12) United States Patent
Kochsiek

(10) Patent No.: US 6,761,096 B1
(45) Date of Patent: Jul. 13, 2004

(54) METHOD AND DEVICE FOR PRODUCING WORKPIECES WITH A NON-CIRCULAR INTERNAL AND/OR EXTERNAL SHAPE

(75) Inventor: Adolf Kochsiek, Leopoldshöhe (DE)

(73) Assignee: Iproptech Maschinen- und Edelstahlprodukte GmbH (DE)

( * ) Notice: Subject to any disclaimer, the term of this patent is extended or adjusted under 35 U.S.C. 154(b) by 0 days.

(21) Appl. No.: 09/214,077

(22) PCT Filed: Jun. 23, 1997

(86) PCT No.: PCT/EP97/03274

§ 371 (c)(1),
(2), (4) Date: Jan. 26, 1999

(87) PCT Pub. No.: WO97/49521

PCT Pub. Date: Dec. 31, 1997

(30) Foreign Application Priority Data

Jun. 21, 1996 (DE) ......................................... 196 24 722

(51) Int. Cl.[7] .............................................. B23B 1/00
(52) U.S. Cl. ............................... 82/1.11; 82/1.2; 82/1.3
(58) Field of Search ........................... 82/1.11, 1.3, 1.2, 82/18, 19, 118, 129, 142

(56) References Cited

U.S. PATENT DOCUMENTS

| | | | | | |
|---|---|---|---|---|---|
| 4,564,914 A | * | 1/1986 | Ballough | ........................ | 82/18 |
| 4,648,295 A | * | 3/1987 | Ley et al. | ........................ | 82/18 |
| 4,651,599 A | * | 3/1987 | Ley | ........................ | 82/18 |
| 5,396,821 A | * | 3/1995 | Okumura | ........................ | 82/1.3 |
| 5,694,819 A | * | 12/1997 | Hormansdorfer | .............. | 82/19 |

FOREIGN PATENT DOCUMENTS

| | | |
|---|---|---|
| DE | 347428 | 1/1922 |
| DE | 911689 | 8/1953 |
| DE | 2250739 | 4/1974 |
| DE | 34 24 494 | 1/1986 |
| DE | 3532558 | 3/1987 |
| DE | 4137923 | 5/1993 |
| DE | 4124538 | 6/1995 |
| EP | 0097346 | 1/1984 |

OTHER PUBLICATIONS

"Neues Verfahren zum Drehen und Schleifen von Polygonprofilen" pp 469–471, 1989.

* cited by examiner

*Primary Examiner*—Henry W. H. Tsai
(74) *Attorney, Agent, or Firm*—R W Becker & Associates; R W Becker

(57) ABSTRACT

In a method for producing workpieces having inner and/or outer contours deviating from a circular shape, at least one workpiece is clamped on a machine and the workpiece is driven in rotation about a rotational axis of the workpiece at a first constant velocity. At least one tool is arranged on a carriage that is moveable radially to the rotational axis of the workpiece as well as axially in the longitudinal direction of the rotational axis of the workpiece. The tool is rotatably driven about a rotational axis of the tool that deviates from the rotational axis of the workpiece such that an active cutting surface of the tool moves on a circular path at a second constant velocity. The second constant velocity is selected such that its revolutions per minute deviate from the revolutions per minute of the first constant velocity with respect to size and/or rotational direction.

9 Claims, 4 Drawing Sheets

METHOD AND DEVICE FOR PRODUCING WORKPIECES WITH A NON-CIRCULAR INTERNAL AND/OR EXTERNAL SHAPE

BACKGROUND OF THE INVENTION

The invention relates to a method for producing inner and/or outer contours deviating from a circular shape on a machine with clamping of at least one workpiece that is rotatably driven at a constant speed and of at least one tool, especially for machining by cutting, wherein the tool is moveable by a carriage radially to the rotational axis of the workpiece as well as axially in the longitudinal direction of this rotational axis. Furthermore, the invention relates to a device for performing this method.

A method for producing workpieces with polygonal outer and/or inner contours by a cutting machining process is known from European patent 0 097 346. In this known method, the workpiece guided on a circular path engages during the entire revolution at a workpiece whereby the path velocity of the tool is respectively changed during each revolution according to a periodic movement law. This permanent change of the path velocity of the tool during each revolution requires, in addition to programmable functional transmitters for the tool drive, a transmission that is controlled according to Pascal curves. Accordingly, this known method allows the manufacture of a plurality of polygonal outer and inner contours. However, because of the permanent control of the path velocity of the tool it requires a great control-technological and machine-related expenditure so that this method can be performed only on devices that are specially designed for this method and have controllable transmissions for the tool drive.

It is an object of the invention to provide a method for producing inner and/or outer contours deviating from a circular shape with which inner and/or outer contours deviating from a circular shape can be produced as desired with minimal control-technological expenditure and with commercially available devices. Furthermore, the invention has the object to provide a device for preforming this method.

SUMMARY OF THE INVENTION

The solution of this object in regard to the method is inventively characterized by the tool with its effective surface being rotatably driven about a tool axis on a circular path with constant velocity that deviates from the revolutions per minute of the workpiece with respect to size and/or direction of rotation, whereby the tool axis is different from the rotational axis of the workpiece.

Due to the different velocities and optionally different rotational directions of the constantly rotating workpiece, on the one hand, as well as due to the different rotational centers and the selectable radius of the circular movement path of the effective tool surface, a plurality of contours of movement paths of the effective tool surface resulting from the afore-mentioned parameters are produced. The special advantage of this method is that, despite the constant rotational velocities of the workpiece and of the tool, different contours deviating from the circular shape can be produced and that, on the other hand, this method can be performed on conventional devices because for driving the tool mounted on a carriage only a separate drive but no complicated controllable transmission for coupling the rotary velocities between tool and workpiece is necessary. The contour of the contour that deviates from the circular geometry is thus only dependent on the respective constant ratio of the revolutions per minute of the axes of rotation, the radius of the outer circle described by the tool as well as the axial offset of the axes of rotation.

According to a preferred embodiment of the inventive method the difference of the revolutions per minute between the workpiece, on the one hand, and the tool, on the other hand, is an integer. The revolutions per minute differences in integers will result, for example, for a ratio of 2:1 in triangular and for a ratio of 3:1 in quadrangular contours.

In an alternative embodiment of the inventive method the plurality of contours to be produced can be further increased such that the tool axis itself is driven on a circular path with constant velocity that deviates with regard to size and/or rotational direction from the revolutions per minute of the tool about an eccentric axis which deviates from the tool axis.

The three possible axes of rotation, i.e., the tool axis, the workpiece axis, as well as the eccentric axis, extend parallel to one another according to one embodiment of the invention. The parallel extending axes of rotation result in a straight inner and/or outer contour of the workpiece, i.e., a contour parallel to the axis of the workpiece.

According to a further embodiment of the invention, the position of the rotational axes relative to one another can be individually adjusted. By adjusting the position of the axes of rotation, the so-called phase angle, screw-shaped outer and/or inner counters can be produced.

For changing the diameter of the contour deviating from the circular geometry as well as for producing conical and spherical contours it is suggested, in a further development of the invention, that the radius of the outer circle described by the tool can be continuously adjusted by a cross-slide rest rotating with the axis of rotation of the tool and arranged on the tool spindle.

The solution to the object with regard to the device is characterized in that the tool, on the one hand, is clamped on a tool spindle and is rotatably driven on a circular path with constant velocity that deviates from the revolutions per minute of the workpiece with regard to size and/or rotational direction about a tool axis which is different from the rotational axis of the workpiece.

Finally, it is suggested with the invention that the tool axis is arranged eccentric to the tool spindle and is driven on a circular path with constant velocity, that deviates from the revolutions per minute of the tool with regard to size and/or direction of rotation, about an eccentric axis which is different from the tool axis. This additional axis of rotation allows the manufacture of a plurality of new inner and/or outer counters deviating from the circular shape. Especially, the manufacture of individual depressions within the workpiece wall or even penetrations of the workpiece wall can be provided with this inventive design of the device.

BRIEF DESCRIPTION OF THE DRAWINGS

Further details and advantages of the invention result from the following description of the attached drawing in which three embodiments of an inventive device are represented. The drawing shows in:

FIG. 4b a polygon contour with concave sides corresponding to FIG. 4a;

FIG. 5b a polygon contour with straight sides corresponding to FIG. 5a;

DESCRIPTION OF PREFERRED EMBODIMENTS

Figure 1A:
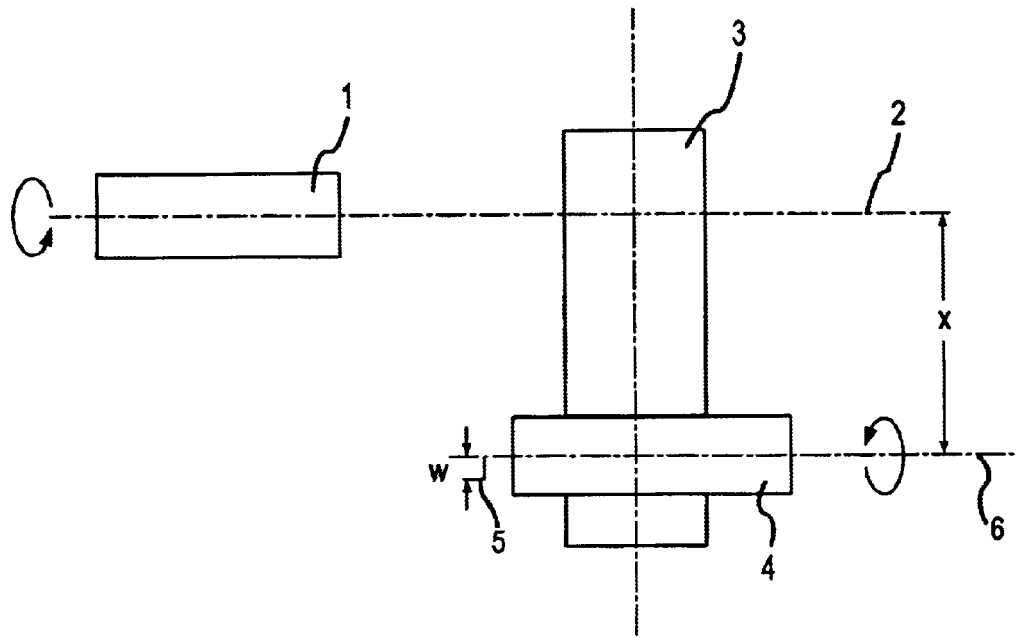
FIG. 1a a schematic design of a first embodiment without eccentric axis.
Figure 2:
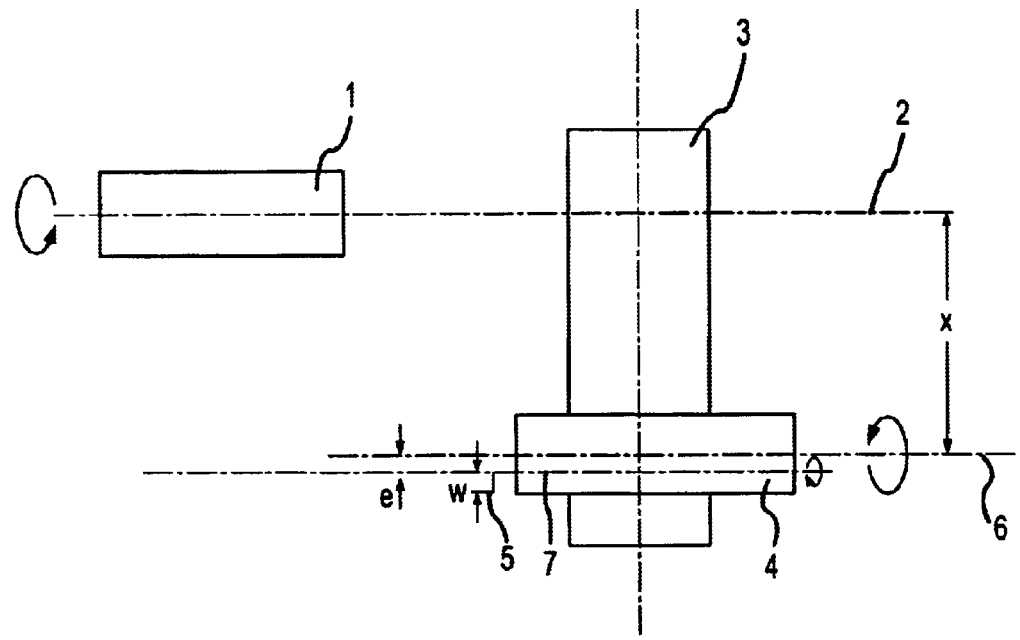
FIG. 2 a schematic design of a device with eccentric axis.
Figure 1B:
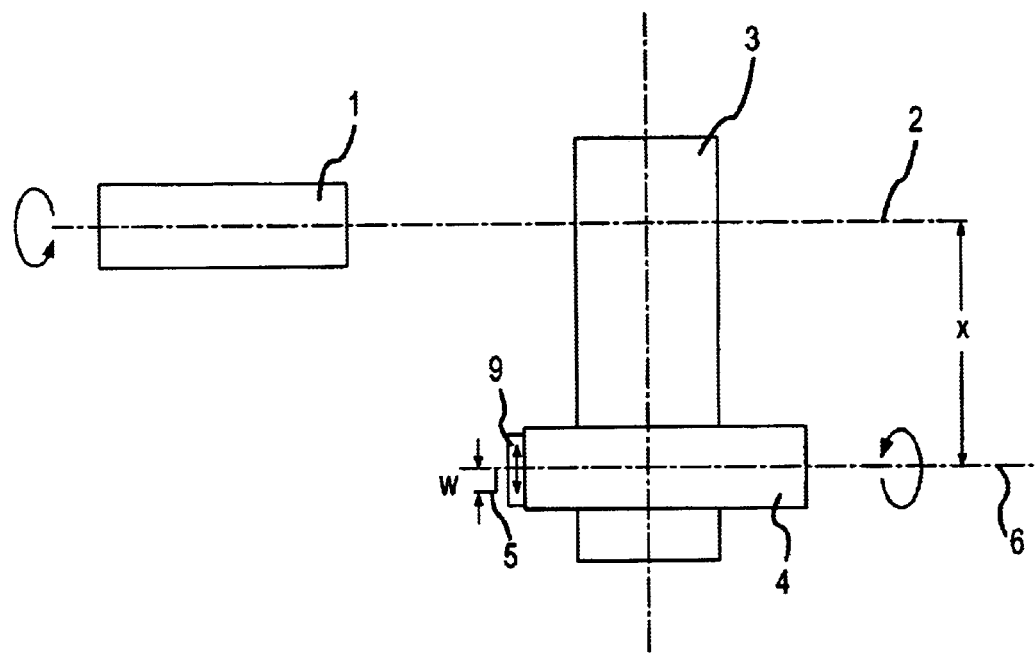
FIG. 1b a schematic design of a further embodiment without eccentric axis, however, comprising a cross-slide rest.

In the drawings FIGS. 1a, 1b, and 2 the principal design of two embodiments of a device for performing the method for producing inner and/or outer contours deviating from a circular shape is schematically shown. A machine not represented in detail, for clamping at least one workpiece, has a workpiece spindle 1 with which the workpiece is rotatably driven about rotational axis 2 of the workpiece. The device comprises furthermore a carriage 3 by which a workpiece spindle 4 is moveable radially to the rotational axis 2 of the workpiece as well as axially in the longitudinal direction of the rotational axis 2 of the workpiece.

According to FIG. 1a the tool 5 is arranged at the tool spindle 4 which is rotatably driven on a circular path with constant velocity, deviating from the revolutions per minute of the workpiece, about a rotational axis 6 of the tool. In the drawing the spacing between the axis of rotation 2 of the workpiece and the axis of rotation 6 of the tool is identified by reference letter x. The spacing between the active surface of the tool 5 and the axis of rotation 6 of the tool is indicated by reference letter w.

The embodiment represented in FIG. 1b has a cross-slide rest 9 arranged on the tool spindle 4 in a fixed manner by which, upon movement of the tool 5 in the direction of the double arrow, the circular radius of the tool 5 is determined.

The second embodiment shown in FIG. 2 of a device for preforming the method for producing inner and/or outer contours deviating from a circular shape has a tool 5 rotating not only about the rotational axis 6 of the tool but also about an eccentric axis of rotation 7 that is radially displaced relative to axis 6. The spacing between the axis of rotation 6 and the eccentric axis of rotations 7 is indicated as eccentricity e. The revolutions per minute of the rotatably driven components rotating about the rotational axes 2, 6, and 7 is always constant but different with respect to size and/or rotational direction. In, the embodiments represented in the drawings FIGS. 1 and 2 the rotational axes 2 and 6, respectively, 2, 6 and 7 are arranged parallel to one another. However, a spacial offset arrangement of the rotational axes 2 and 6, respectively, 2, 6, and 7 to one another by a predetermined angle is also possible.

The representations 3 through 7 described in the following show in an exemplary fashion inner and/or outer contours which are producible with devices according to drawings FIGS. 1 and/or 2.

Figure 3:
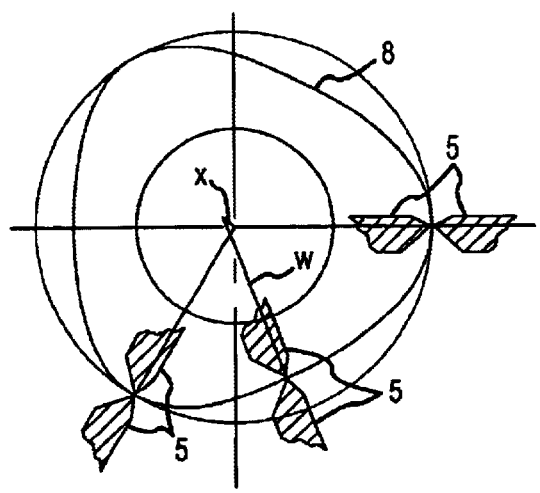
FIG. 3 a triangular polygon contour producible with a device according to FIG. 1.

FIG. 3 shows a workpiece 8 having a triangular polygon contour. As the represented point of attack of the tool 5, shown as an example, at the tool 8 shows, this polygon contour can be produced as an outer and/or inner contour. The parameters named in the following for producing such a triangular polygon contour show that they can be produced with a device according to FIG. 1, i.e., without eccentricity e. Based on the integer ratio of −2 to 1 of the revolutions per minute, the represented triangular polygon contour results. The minus sign of the revolutions per minute about the rotational workpiece axis 2 shows that the rotational direction is counter to the rotation about the rotational axis 6 of the tool. In the drawing FIG. 3 the spacing between the axis of rotation 2 of the workpiece and the axis of rotation 6 of the tool is indicated, corresponding to FIG. 1, with x and the one between the active surface of the tool and the axis 6 of the tool with w. In the table they are indicated as radii.

|  | workpiece | eccentric | tool |
| --- | --- | --- | --- |
| radius | 2.0 | 0.0 | 18.0 |
| phase angle | 0.0 | 0.0 | 0.0 |
| revolutions per minute | −2.0 | 0.0 | 1.0 |

Figure 4A:
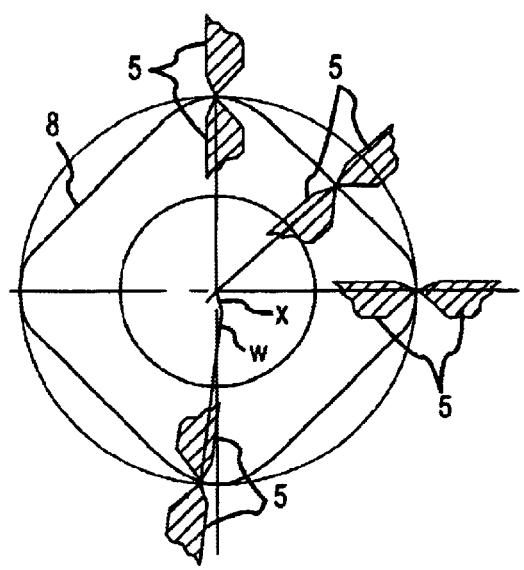
FIG. 4a a quadrangular polygon figure with straight sides producible with a device according to FIG. 1.

In FIG. 4a a workpiece 8 with a quadrangular polygon contour is shown. As can be seen from the correlated parameter table, this polygon contour, deviating from that of FIG. 3, has been achieved simply by changing the ratio of the number of revolutions from −2:1 to −3:1.

|  | workpiece | eccentric | tool |
| --- | --- | --- | --- |
| radius | 2.0 | 0.0 | 18.0 |
| phase angle | 0.0 | 0.0 | 0.0 |
| revolutions per minute | −3.0 | 0.0 | 1.0 |

Figure 4B:
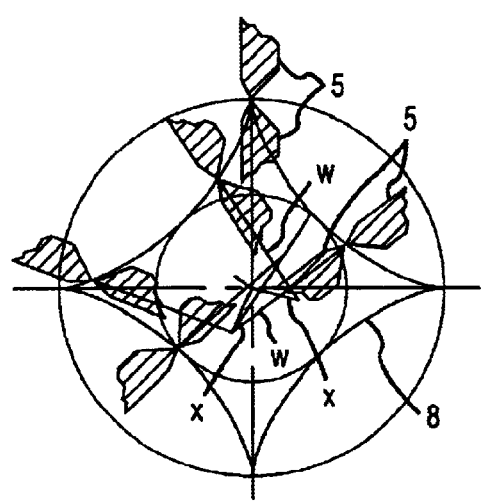

FIG. 4b shows a quadrangular polygon contour but with concavely extending sides. As can be taken from the corresponding parameter table, this change of the profile of the sides of the polygon contour has been achieved by changing the spacings x and w.

|  | workpiece | eccentric | tool |
| --- | --- | --- | --- |
| radius | 5.0 | 0.0 | 15.1 |
| phase angle | 0.0 | 0.0 | 0.0 |
| revolutions per minute | −3.0 | 0.0 | 1.0 |

Figure 5A:
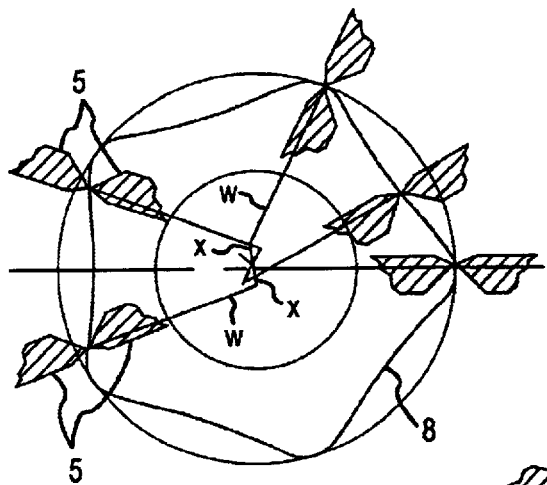
FIG. 5a FIG. 5a a pentagonal polygon contour with concave sides producible with a device according to FIG. 1.

FIG. 5a shows a workpiece 8 with a pentagon-shaped polygon contour. As can be seen in the parameter table, this polygon contour has been achieved by changing the ratio of the number of revolutions to a ratio of −4:1. All other parameters correspond to those of the contours according to FIG. 3 and FIG. 4a.

|  | workpiece | eccentric | tool |
| --- | --- | --- | --- |
| radius | 2.0 | 0.0 | 18.0 |
| phase angle | 0.0 | 0.0 | 0.0 |
| revolutions per minute | −4.0 | 0.0 | 1.0 |

Figure 5B:
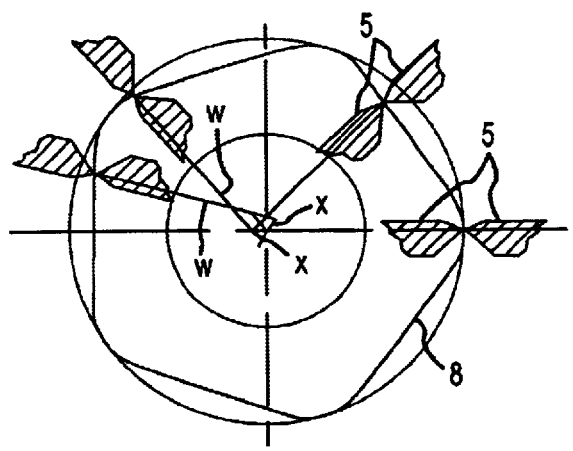

FIG. 5b shows also a pentagon-shaped polygon contour but this pentagon has straight sides in comparison to the pentagon shown in FIG. 5a. The change of the profile of the sides of the pentagon has been achieved again by changing the parameters of the spacings x and w as can be seen from the corresponding parameter table.

|  | workpiece | eccentric | tool |
|---|---|---|---|
| radius | 1.3 | 0.0 | 18.7 |
| phase angle | 0.0 | 0.0 | 0.0 |
| revolutions per minute | −4.0 | 0.0 | 1.0 |

Figure 6:
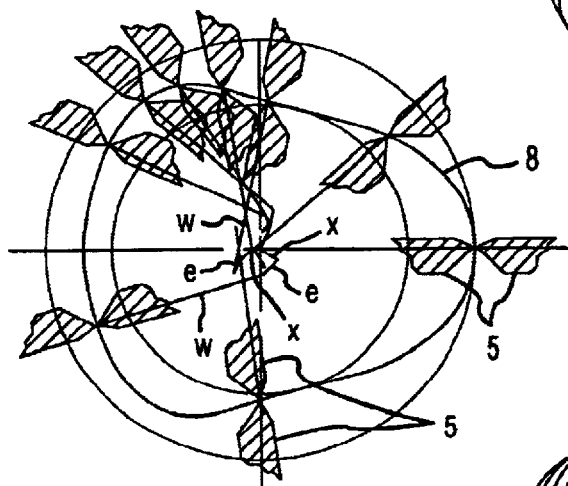
FIG. 6 a polygon figure produced with a device according to FIG. 2.

FIG. 6 is a workpiece 8 with a polygon contour that has been produced with the aid of the device according to FIG. 2, i.e., with an additional eccentric axis of rotation 7. As can be seen in the drawing as well as in the corresponding parameter table, the spacing indicated by x between the axis of rotation 2 of the workpiece and the axis 6 of the tool corresponds to the eccentricity e.

|  | workpiece | eccentric | tool |
|---|---|---|---|
| radius | 2.0 | 2.0 | 18.0 |
| phase angle | 0.0 | 0.0 | 0.0 |
| revolutions per minute | −2.0 | 3.0 | 1.0 |

Figure 7:
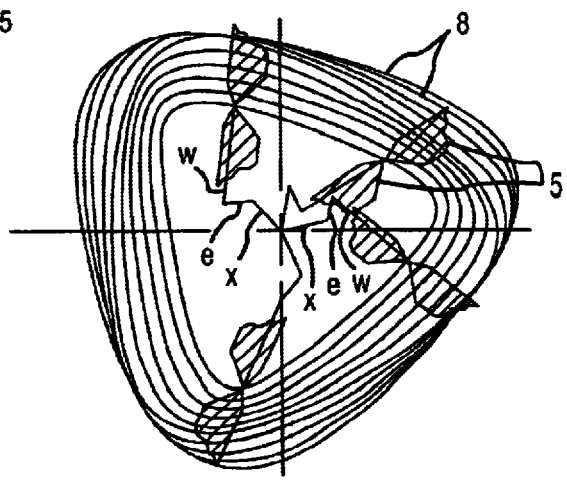
FIG. 7 a polygon contour produced with a device according to FIG. 2.

FIG. 7 shows a workpiece 8 that has a triangular, helical and conically extending polygon contour. As can be taken from the corresponding parameter table, the helical extension as well as the conical embodiment of the workpiece contour has been achieved in that during movement axially in the longitudinal direction of the axis of rotation 2 of the workpiece for every cut preformed by the tool 5 the phase angle of the axis of rotation 2 of the workpiece to the axis of rotation 6 of the tool as well as the spacing x have been changed. The helical contour is produced by the changing phase angle. The conical embodiment of the workpiece 8 is achieved by the uniform change of the spacing x between the axis of rotation 2 of the workpiece and the axis of rotation 6 of the tool along the axis of rotation 2 of the workpiece.

|  | workpiece | eccentric | tool |
|---|---|---|---|
| 1. First cut |  |  |  |
| radius | 14.0 | 3.0 | 11.0 |
| phase angle | 40.0 | 0.0 | 0.0 |
| revolutions per minute | 1.0 | −2.0 | 1.0 |
| 2. Second cut |  |  |  |
| radius | 13.0 | 3.0 | 11.0 |
| phase angle | 40.0 | 0.0 | 0.0 |
| revolutions per minute | 1.0 | −2.0 | 1.0 |
| 3. Third cut |  |  |  |
| radius | 12.0 | 3.0 | 11.0 |
| phase angle | 20.0 | 0.0 | 0.0 |
| revolutions per minute | 1.0 | −2.0 | 1.0 |
| 4. Fourth cut |  |  |  |
| radius | 11.0 | 3.0 | 11.0 |
| phase angle | 10.0 | 0.0 | 0.0 |
| revolutions per minute | 1.0 | 2.0 | 1.0 |

-continued

|  | workpiece | eccentric | tool |
|---|---|---|---|
| 5. Fifth cut |  |  |  |
| radius | 10.0 | 3.0 | 11.0 |
| phase angle | 0.0 | 0.0 | 0.0 |
| revolutions per minute | 1.0 | −2.0 | 1.0 |

As can be seen from the above examples, according to drawings FIGS. 3–7, different inner and/or outer contours deviating from the circular shape can be achieved by changing only one of the fixedly programmable parameters. These parameters, once set, especially the revolutions per minute, remain constant during the entire machining process. Only for producing helical and/or conical contours an adjustment of individual parameters during advancement of the carriage 3 along the axis of rotation 2 of the workpiece is necessary. The different velocities and optionally rotational directions of the constantly rotating workpiece 8, on the one hand, and the tool 5, on the other hand, as well as the deviating rotational centers and the selectable radii of the circular movement paths will result in the multiple contours based on the aforementioned parameter-generated movement path of the active surface of the tool which, despite constant rotational velocities, results in different profilings. When, for example, the spacing x between the workpiece axis of rotation 2 and the axis of rotation 6 of the tool is greater than the radius w of the movement path of the tool 5, a polygon inner contour will result, for example, as a function of the rotational direction and the differential revolutions per minute while the reverse ratio results in a corresponding outer contour.

As can be seen from the above description, with the disclosed method, respectively, the corresponding device different inner and/or outer contours deviating from a circular shape can be produced with conventional machines.

The specification incorporates by reference the entire disclosure of German priority document 196 24 722.5 of Jun. 21, 1996 as well as of International Application PCT/EP97/03274 of Jun. 23, 1997.

The present invention is, of course, in no way restricted to the specific disclosure of the specification and drawings, but also encompasses any modifications within the scope of the appended claims.

List of Reference Numerals

1 Workpiece spindle
2 Axis of rotation of workpiece
3 Carriage
4 Tool spindle
5 Tool
6 Axis of rotation of tool
7 Eccentric axis of rotation
8 Workpiece
9 Cross-slide rest
x Spacing between rotational axes of workpiece and tool
w Spacing between active surface of tool and rotational axis of tool
e Eccentricity

What is claimed is:

1. A method for producing workpieces having inner and outer contours deviating from a circular shape, said method comprising the steps of:
   clamping at least one workpiece on a machine and driving said workpiece in rotation about a first rotational axis of said workpiece at a first constant velocity;

arranging at least one tool on a carriage so as to be moveable radially to said first rotational axis of said workpiece as well as axially in the longitudinal direction of said first rotational axis of said workpiece;

rotatably driving said tool about a second rotational axis of said tool that deviates from said first rotational axis of said workpiece such that an active cutting surface of said tool moves on a circular path at a second constant velocity;

selecting said second constant velocity such that the revolutions per minute deviate from the revolutions per minute of said first constant velocity, wherein the deviation of said second constant velocity of said tool from said first constant velocity of said workpiece is a deviation of at least one of the sizes of said first and second constant velocities relative to one another and the directions of said first and second constant velocities relative to one another.

2. A method according to claim 1, wherein in said step of selecting the difference between the revolutions per minute of said first constant velocity and of said second constant velocity is an integer.

3. A method according to claim 1, further including the step of driving said of said tool on a circular path about a third eccentric axis deviating from said second axis of rotation of said tool at a third constant velocity while also rotating said tool about said second axis of rotation, wherein the revolutions per minute of said third constant velocity deviate from the revolutions per minute of said second constant velocity with regard to size and rotational direction.

4. A method according to claim 1, wherein said first, second, and third rotational axes of said tool and of said workpiece extend parallel to one another.

5. A method according to claim 1, further comprising the step of individually adjusting a position of said first, second, and third rotational axes of said tool and of said workpiece to one another.

6. A method according to claim 1, wherein a radius of an outer circle described by said tool is continuously adjustable by a cross-slide rest rotating with said tool about said second rotational axis of said tool.

7. A device for performing the method according to claim 1, said device comprising:

a workpiece spindle (1) having clamped thereto at least one workpiece (8) and driving said workpiece (8) at a first constant velocity;

at least one tool (5) clamped on a tool spindle (4);

a carriage (3) on which said toot spindle (4) and said tool (5) are arranged;

said tool (5) moveable by said carriage (3) radially relative to a first rotational axis (2) of said workpiece (8) as well as axially in the longitudinal direction of said rotational axis (2) of said workpiece (1);

wherein said tool (5) is rotatably driven by said tool spindle (4) about a second rotational axis (6) of said tool (5), which deviates from said rotational axis (2) of said workpiece (1), on a circular path at a second constant velocity that deviates from the revolutions per minute of said first constant velocity, wherein the deviation of said second constant velocity of said tool (5) from said first constant velocity of said workpiece (8) is a deviation of at least one of the sizes of said first and second constant velocities relative to one another and the directions of said first and second constant velocities relative to one another.

8. A device according to claim 7, wherein said second rotational axis (6) of said tool (5) is arranged eccentrically to said tool spindle (4) and said tool is driven on a circular path at a third constant velocity about a third eccentric axis (7) that deviates from said second rotational axis (6) of said tool (5) while also rotating said tool about said second rotational axis (6), wherein said third constant velocity deviates from the revolutions per minute of said second constant velocity with respect to size and rotational direction.

9. A device according to claim 7, further comprising a cross-slide rest (9) arranged fixedly on said tool spindle (4) in order to continuously adjust a radius of an outer circle described by said tool (5).

* * * * *

UNITED STATES PATENT AND TRADEMARK OFFICE
CERTIFICATE OF CORRECTION

PATENT NO. : 6,761,096 B1
DATED : July 13, 2004
INVENTOR(S) : Kochsiek

It is certified that error appears in the above-identified patent and that said Letters Patent is hereby corrected as shown below:

Title page,
Item [54], Title, should read as follows: -- METHOD AND DEVICE FOR PRODUCING INNER AND/OR OUTER CONTOURS DEVIATING FROM A CIRCULAR SHAPE --
Item [73], Assignee, should read as follows: -- Assignee: Iprotec Maschinen- und Edelstahlprodukte GmbH --

Signed and Sealed this

Thirty-first Day of August, 2004

JON W. DUDAS
*Director of the United States Patent and Trademark Office*